United States Patent [19]

Beardsley

[11] Patent Number: 4,693,280
[45] Date of Patent: Sep. 15, 1987

[54] END CLOSURE FOR SHIRRED CASING STICKS

[75] Inventor: Robert A. Beardsley, Osceola, Ark.

[73] Assignee: Viskase Corporation, Chicago, Ill.

[21] Appl. No.: 842,225

[22] Filed: Mar. 21, 1986

[51] Int. Cl.$^4$ ............................................. F16L 11/12
[52] U.S. Cl. .................................... 138/118.1; 130/89; 426/135
[58] Field of Search ...................... 138/109, 118.1, 118, 138/89; 229/802; 353/120, 121; 426/105, 135, 138

[56] References Cited

U.S. PATENT DOCUMENTS

| | | | |
|---|---|---|---|
| 3,274,005 | 9/1966 | Alsys | 99/176 |
| 3,383,222 | 5/1968 | Alsys et al. | 99/176 |
| 3,892,869 | 7/1975 | Sheridan et al. | 426/138 |
| 4,551,370 | 11/1985 | Nausedas | 428/36 |

FOREIGN PATENT DOCUMENTS 83113104 12/1983 European Pat. Off. .

Primary Examiner—James E. Bryant, III
Attorney, Agent, or Firm—Roger Aceto

[57] ABSTRACT

An end closure for a shirred casing stick is formed from casing inturned into the bore of the stick. A vacuum assist is used to prepleat the casing within the bore prior to compaction. The resulting end closure is a generally cylindrical plug composed of accordion-type pleats and having an end portion which has a substantially uniform density about the longitudinal axis of the plug and a second portion which has an asymmetrical density. The second portion has two longitudinally extending sections; one having its pleats formed of a single ply of casing and a diametrically opposite section having its pleats formed of three plies of casing, thereby providing the asymmetric density.

6 Claims, 9 Drawing Figures

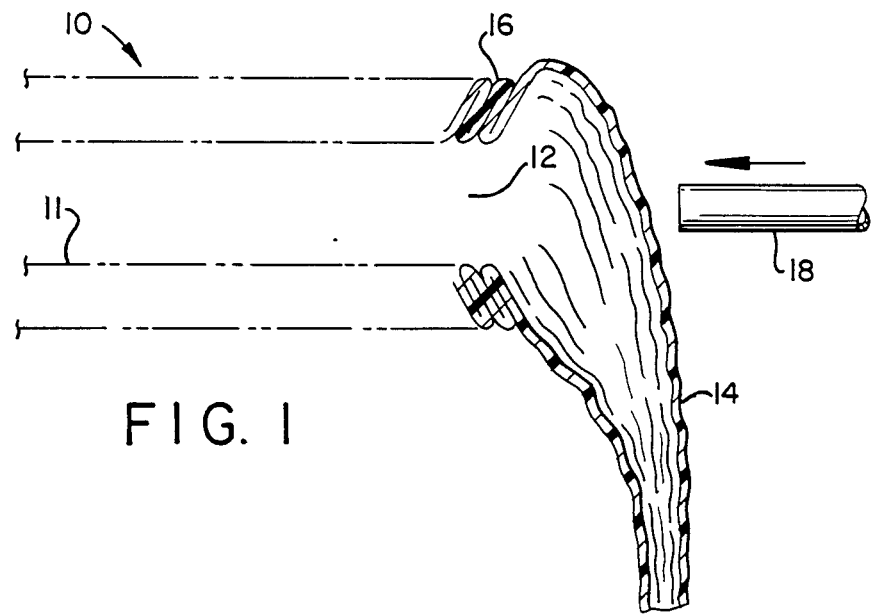
FIG. 1
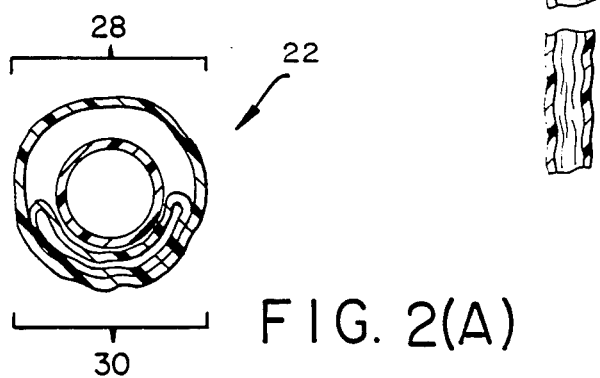
FIG. 2(A)
FIG. 3
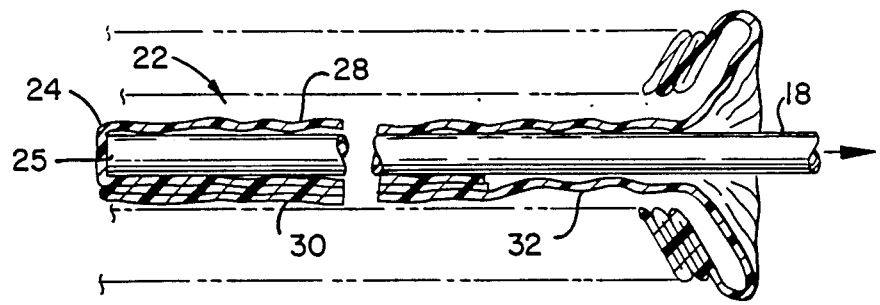

END CLOSURE FOR SHIRRED CASING STICKS

FIELD OF THE INVENTION

The present invention relates to an end closure of casing material for hollow shirred casing sticks and to a method of making the end closure. More particularly, the invention relates to an axially compressed closure forming a plug of casing material implanted in an end of the hollow shirred casing stick.

BACKGROUND

Shirred food casings of flexible cellulosic tubing are commonly used in the food industry for making and processing various food products such as frankfurters, sausages, or the like. Consequently, the methods of making the shirred casing articles or "sticks", and the apparatus and methods relating to the use of the shirred casing to produce a stuffed casing food product, are all well known in the art. For example, a shirred casing, a shirring method and a shirring apparatus are all described generally in U.S. Pat. No. 2,984,574. U.S. Pat. No. 3,115,668 describes a machine for stuffing a shirred casing stick to make linked sausages or frankfurters.

The advent of automatic machines for stuffing and/or linking of shirred food casings as described, for example, in U.S. Pat. No. 3,115,668, has greatly increased the production rate of sausage type products. In an automated stuffing operation, as described in the '688 Patent, hollow shirred casing sticks are fed automatically and rapidly onto the stuffing horn of the stuffing machine. The horn picks up the shirred casing stick by extending through the bore of the hollow stick to the fore end of the stick. The horn then advances the stick into a chuck. The chuck grips the fore end of the stick and rotates the stick about the horn during the stuffing operation to link the stuffed casing.

It is common to have a portion of the casing turned inward into the bore of the stick in order to plug the fore end of the bore. The end closure or "plug" formed by this inturned casing performs several functions. For example, the stuffing horn pushes on the plug for advancing the stick towards the chuck. Once the stick fore end is firmly gripped by the chuck, the advancing horn pushes the plug out of the stick bore. If the plug is too firmly anchored, the force required to push the plug from the bore (hereafter referred to as the "deplug force") can exceed the tensile strength of the stick. Should this happen, the stick will lose its integrity and separate into two pieces of shirred casing connected by a length of deshirred casing. The connecting length of deshirred casing is liable to twist around the horn and cause the stick to seize on the horn. Another possible result of a high deplug force is a tearing of the casing or a "blown end" which allows the stuffing emulsion to spew from the casing.

Another function of the plug is that it closes the casing so it can be stuffed with emulsion. In this respect, the plug must be sufficiently coherent to contain the pressure of the stuffing operation until a first link is formed. However, the plug also must be easily opened so that at the end of stuffing, emulsion can be stripped from the first links in a subsequent operation as described hereinbelow.

In general, forming a closure at one end can be most uniformly and economically accomplished during the manufacturing of the shirred casing stick. To this end, various types of casing closures and methods for forming such closures are known in the art. For example, Alsys, U.S. Pat. No. 3,274,005, discloses a shirred casing having an end which is twisted closed outside of the hollow stick and which then is pulled into a position within the bore of the shirred casing. A second Alsys U.S. Pat. No. 3,383,222, discloses a shirred casing having a compressed plug end closure implanted in the fore end of the stick. Here the plug is formed by first pulling a tab of the casing laterally across the bore of the stick, inturning the tab into the end of the casing stick, and then axially compressing the inturned tab against a fixed surface with a plunger inserted into the other end of the casing stick. Sheridan et al., U.S. Pat. No. 3,892 likewise discloses a closure formed within the bore of a shirred stick from casing material that has been inturned into the bore and axially compressed.

In the Alsys '222 Patent and Sheridan, et al. '869 Patent, the inturned portion of casing is asymmetrical prior to compaction inasmuch as the casing material making up the inturned portion is not uniformly distributed around the axis of the shirred stick, but is concentrated on one side of the inturned casing portion. Specifically, there is only one ply of casing material extending in a longitudinal direction along one side of the inturned portion and three plies extending along on the opposite side. When, as taught in these patents, this inturned casing portion is longitudinally compacted within the confines of the stick bore, the plies collapse one against another into accordion-type pleats which bear tightly against the inner peripheral surface of the shirred stick, and which extend across the longitudinal axis of the bore. This forms a tightly compacted plug which has a relatively symmetrical or uniform density about its axis, and which is firmly planted in the stick bore.

In contrast to the Alsys '222 and Sheridan et al. '869 Patents, U.S. Pat. No. 4,551,370 and European Patent No. 114,397 disclose an inturned portion of casing which is symmetrical about the axis of the shirred stick prior to compaction. Compaction of this symmetrical inturned portion within the bore of the shirred stick is said to result in a closure which has a more uniform density than the closure of either the Alsys '222 Patent or the Sheridan et al. '869 Patent.

One desideratum of an end closure for the casing stick is that it be made of as short a casing length as possible. Using an excessive amount of casing from the shirred stick to form the closure means that less casing material is left in the shirred stick for stuffing. Also, it is important that the closure should not be too tightly anchored in the bore of the shirred stick or the surrounding casing could tear or otherwise break as the tightly anchored closure is forced from the fore end of the casing stick. Another desirable feature is that the closure should not be too hard. This is because at the start of the stuffing cycle, the closure is forced out of the bore of the casing stick and into a linker mechanism which has meshing components that form the stuffed casing into links. Often the closure does not properly enter the linker mechanism and if this happens, a "hard" closure is likely to damage the meshing components. However, if the closure is "soft", the meshing components are better able to accommodate and crush the material of the closure between them so there is less likelihood of damage to the equipment and to the casing.

The preferred closure which has the desirable features as set out above and which is able to withstand and contain the pressure of emulsion at the onset of the stuffing operation, should also be able to be stripped of emulsion at the end of the stuffing and linking operation. In this respect, a length of unstuffed casing is needed for tying one stuffed length of casing to another for subsequent processing. Also, the first few links produced are usually malformed or understuffed. Accordingly, to provide the unstuffed casing length needed for tying, and to recover, for reuse, the emulsion contained in the first few links, the operator manually squeezes the links and strips the food emulsion from the links towards the closure in a so called "milking" action. This causes the closure to unravel, unwind or otherwise open to permit the operator to squeeze the food product out of the first few links.

It should be noted that any closure which is simply twisted closed or axially compressed, such as those described hereinabove, will begin to lose its integrity responsive to the pressure of the stuffing process. Accordingly, it is important that the closure not become completely unraveled and open prior to the time a first link is formed. Otherwise a "blown end" results which sprays food emulsion from the casing and over the stuffing machine. This causes a delay in production, because the machine must be shut down and the emulsion must be cleaned from the machine in order to prevent bacterial growth. Thus, a properly formed closure will not completely unravel or otherwise open during the initial stages of the stuffing operation, but it will unravel and open responsive to the pressure of the "milking" action so that the food emulsion in the first few links can be expressed from the casing and recovered.

The end closure of the present invention exhibits all the desirable features in that:

(1) it does not require an excessive amount of casing and is easily formed;

(2) it provides a "soft" plug which, if it becomes entangled within the linker mechanism, is not likely to cause damage;

(3) it is not tightly anchored in the stick bore and is expelled at the onset of stuffing without damaging the shirred stick;

(4) it is able to contain the pressure of the food emulsion at the onset of stuffing; and (5) it is easily unraveled during the stripping or "milking" operation at the end of stuffing.

A still further desirable feature of the present invention is that the end closure can be made so that the tightness of its implantation in the bore of the casing stick is controllable. Heretofore, the deplugging force depended upon such variables as the length of casing contained in the plug and the force applied to compact the casing to form the plug. Modifying the deplugging force to fit the needs of a customer required an empirical balancing of these variables. For example, decreasing the length of casing in the plug might lower the deplugging force, but it also reduces the ability of the plug to contain the pressure of the food emulsion at the onset of stuffing. Increasing the compaction force might anchor the plug more securely in the casing bore, but it increases the hardness of the plug and the risk of damage to the linker mechanism.

As a general rule, the deplug force should be as low as possible without compromising the other desirable characteristics of an end closure. In the present invention, however, once the lowest deplug force is established, the deplugging force can be raised to meet a customer's needs as dictated by his process and equipment parameters, without changing either the length of casing in the plug or the compaction force.

SUMMARY OF THE INVENTION

The present invention may be characterized by a hollow shirred casing stick having an inner peripheral surface which defines an axial bore through the stick and having an integral end closure disposed within the bore of the casing stick, the end closure being composed of casing drawn from the fore end of the shirred stick and formed into a plug within the bore, the plug comprising:

(a) a generally cylinderical body composed throughout its length of accordion-type pleats including a first end portion facing into the bore, an intermediate portion and a second end portion facing out from the bore;

(b) the first end portion containing pleats which extend across the longitudinal axis of the bore and which press against the inner peripheral surface to form an imperforate and continuous wall transverse to the longitudinal axis of the bore; and (c) the intermediate portion containing pleats, which in longitudinal cross section, are arranged in two longitudinally extending rows one of said longitudinally extending rows being composed of pleats of a single ply of casing and the other of said rows being composed of pleats of three plies of casing and, the pleats in the rows having proximal ends which press one against another in the region of the longitudinal axis of the bore and the pleats in the rows have distal ends which press against the inner peripheral surface.

More specifically, the generally cylindrical body has an intermediate portion which is asymmetrical in density about its longitudinal axis, in that a first longitudinally extending section along one side of the plug is composed of pleats containing one ply of casing and a second longitudinally extending section on an opposite side of the plug is composed of pleats containing three plies of casing.

In its method aspect, the present invention is characterized by a method for forming an end closure within the bore of a shirred casing stick comprising the steps of:

(a) pulling a tab of casing from the casing stick laterally across a fore end of the bore;

(b) inverting the tab of casing into the bore and thereby forming a hollow cylinder of casing within the bore, the hollow cylinder having a closed end formed from the inverted tab buried in the bore, and an open end towards the fore end of the bore;

(c) locating a rod in the stick bore and within the casing cylinder and positioning an end of the rod adjacent the closed end of the casing cylinder;

(d) creating a differential pressure across the casing cylinder and thereby collapsing the casing cylinder inward against the rod;

(e) withdrawing the rod from the stick bore while maintaining the differential pressure to hold the collapsed casing cylinder against the rod; and (f) during the course of withdrawing the rod, wiping casing from the rod and into accordion-type pleats disposed within the stick bore; and thereafter (g) removing the rod from the stick bore while maintaining the pleated casing within the stick bore.

In addition, if a relatively long tab is pulled and inverted, the casing cylinder will have two longitudinally extending wall portions; one composed of a single ply of casing and another composed of three plies of casing. In this case the method would include the step of maintaining a diametrical separation of the wall portions while longitudinally collapsing the hollow cylinder towards the fore end of the bore, thereby pleating the casing contained in said wall portions into accordion-type pleats which form a generally cylindrical plug having a longitudinally extending sectibn containing pleats of a single ply of casing, and having a diametrically opposite longitudinally extending section containing pleats of three plies of casing.

The end closure of the present invention is a plug composed of casing material turned into the bore of the casing stick and compacted in situ. Prior to compaction, the inturned casing is formed into loose accordion-type pleats using a vacuum assist which draws the inturned casing towards the longitudinal axis of the stick bore and away from the surface of the stick bore so these pleats do not press tightly against the bore surface.

In a preferred embodiment there is an asymmetrical distribution of casing material about the longitudinal axis of the plug. In particular, the pleats at the surface of the plug along one longitudinally extending section contain fewer plies of casing material (and therefore are less dense) than the pleats along a longitudinally extending section on the opposite side of the plug. Moreover, due to the vacuum assist, these pleats radiate and extend outwardly from a central core section of the plug, so that the plug tends to be more dense adjacent and about this central core section than it is along the outer periphery of the plug. The plug also has a dimple or hollow at its end which faces outward from the bore of the casing stick.

The formation of pleats (prior to compaction) using the vacuum assist, the higher density about the core and the lower density at its outer periphery, and the dimple or hollow, all contribute to provide the end closure with the desirable features of a "soft" plug, which is able to contain the pressure of the food emulsion at the onset of stuffing, has a low deplug force, is easily crushed if entangled in the meshing linker mechanism, and is easily opened by "milking" at the end of the stuffing operation.

The plug configuration of the present invention is obtained by drawing a tab of casing across the stick bore and then turning the tab of casing into the bore of the casing stick in a conventional manner using an inverting rod to push or pull the tab into the bore, or by other means such as a puff of air. Turning the tab into the stick bore can cause additional casing to deshirr from the fore end of the stick and to turn into the stick bore. The casing inverted into the bore of the casing stick in this fashion has a portion of its length which is asymmetrically distributed about the longitudinal axis of the stick bore, wherein the length of this asymmetrical portion is determined by the length of the tab of casing pulled across the bore. In this respect, the inverted tab of casing forms a hollow cylinder made up of four plies of casing wherein the cylinder, in transverse cross section, has one wall portion composed of one ply of casing and an opposite wall portion composed of three plies of casing.

A differential pressure is created across the casing cylinder to collapse it inwardly and hold it against a rod located in the casing cylinder, and away from the surface of the stick bore. Preferably, the inverting rod pushes the tab into the stick bore and is hollow so that the differential pressure is created by evacuation through the rod. However, the differential pressure can be created by pressurizing the stick bore.

Evacuating the rod to create the differential pressure forces and holds the casing against the rod. While maintaining the differential pressure, the inverting rod is withdrawn from the stick bore. This wipes the casing from the rod and forms the wall of the casing cylinder into accordion-type pleats and thereby shortens the cylinder. The rod maintains a diametrical separation of the pleats so that in the shortened cylinder the pleats, in longitudinal cross section, are arranged in two rows. In the portion having the asymmetrical distribution of casing, one of the rows has its pleats formed from the single ply of casing extending along one side of the rod and the other row has its pleats formed from the three plies of casing extending along an opposite side of the rod.

It is preferred to withdraw the rod from the stick bore with little or no rotation. This will arrange the pleats of the single ply of casing in a generally straight line along one side of the rod and the pleats of three plies of casing in a generally straight line along an opposite side of the rod. However, the rod can be twisted as it is inserted into the stick bore or as it is pulled from the stick bore so as to distribute pleats along a helical path wherein the pleats of one ply are still opposite the pleats of three plies. Thus, it should be understood that the term "longitudinally extending" is used herein to describe the distribution of accordion-type pleats in either a generally straight line distribution or in a generally helical line distribution of pleats.

After the pleats are formed, the rod is removed, thereby leaving a vacant core which extends generally along the longitudinal axis of the shortened cylinder of casing. The shortened cylinder is then compacted by a conventional tamper to form a plug.

The casing pleats in contact with the tamper are pressed to a wall which extends across the stick bore so that pleats press against the bore surface. However, the pleats away from the tamper tend to maintain their integrity and separation during compaction. Accordingly, the pleats in the two rows will have their distal ends pressing against the stick bore surface, but at their proximal ends the pleats of one row will press against the pleats of the other row. In the portion of pleats formed from the inturned tab, the result is an asymmetrical distribution of the pleated casing material about the longitudinal axis of the plug. In this respect, the plug has a longitudinally extending section along one side which contains pleats of one ply and is less dense than a longitudinally extending section along an opposite side which contains pleats of three plies of casing. Moreover, as formed, the pleats are most crowded at the surface of the inverting rod so that when this rod is removed, the density tends to be greatest about and along the vacant core.

During compaction, pleats will enter and tend to fill and close the vacant core. However, even after compaction, an opening may be left in the end of the plug which faces outward from the stick bore. This opening, when present, and its depth, is determined by such factors as the length of the inturned cylinder of casing and the compaction force exerted by the tamper.

It has been found that wiping pleats from the inverting rod while maintaining the casing cylinder collapsed against the rod by application of differential pressure provides an additional advantage. The pleats formed in this manner do not press tightly against the surface of the stick bore. In contrast, compacting the casing cylinder with a tamper in a conventional manner (i.e., without pre-forming the pleats as described above) causes it to collapse longitudinally into pleats that are all pressed tightly against the surface of the stick bore.

In the present invention, the pre-formed pleats do not press tightly against the surface of the stick bore and, consequently, the plug of this invention, when compacted, exhibits a lower deplug force than a conventionally compacted plug. Also, due in part to the prepleating of casing in the inventive plug, the plug exhibits a "softness" not found in plugs compacted in a conventional manner.

It has been found that the lowest deplug force results when a relatively high differential pressure is maintained during pleat formation. A high differential pressure insures that substantially all of the casing cylinder is wiped from the inverting rod and gathered into pleats. As the differential pressure decreases, less of the casing cylinder is wiped off the rod as pleats. This is because the resistance to pleating eventually will overcome the holding force of the differential pressure and the inverting rod will pull free, leaving a portion of the casing cylinder unpleated. The result, as differential pressure decreases, is an increasing length of casing cylinder that remains unpleated. During subsequent compaction, this unpleated length will collapse longitudinally into pleats composed of four plies of casing pressed against the surface of the stick bore. These pleats tend to increase the deplug force. Thus, once the differential pressure required for producing a minimum deplug force is determined (i.e., substantially all of the casing cylinder is prepleated about the inverting rod), the deplug force can be increased by decreasing the differential pressure during withdrawal of the inverting rod so that more of the casing cylinder is left unpleated prior to compaction.

DESCRIPTION OF THE DRAWING

FIGS. 1-6 illustrate, in schematic fashion, a sequence of steps of one method for forming the end closure of the present invention;

FIG. 2A is a cross-sectional view, on an enlarged scale, taken along lines 2A—2A of FIG. 2.

DESCRIPTION OF THE PREFERRED EMBODIMENTS

Figure 2:
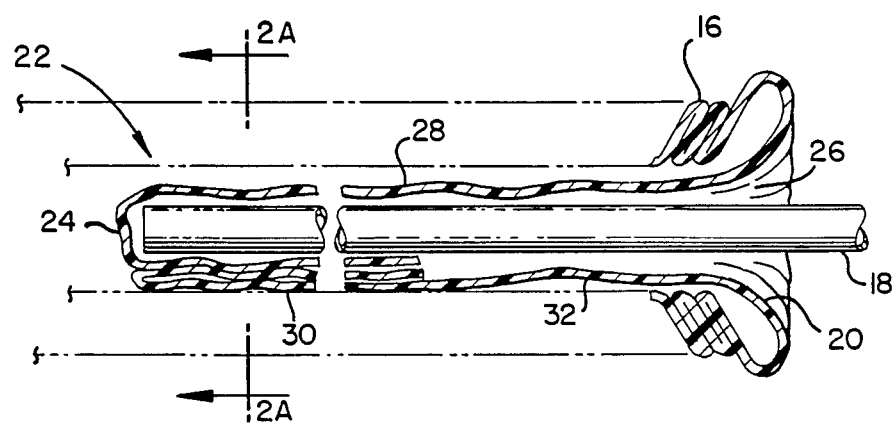

Referring to the drawings, FIG. 1 shows a shirred stick 10. The inner peripheral surface 11 of the stick defines an axial bore 12. A tab of casing 14 is pulled laterally from the fore end 16 of the stick to occlude or obstruct the bore at the fore end. A hollow inverting rod 18 is advanced against the tab and inserted into the bore of the shirred stick to the position shown in FIG. 2.

During the insertion of the rod, the tab 14 of casing is inverted and pushed into the bore of the stick. Depending upon the length of the tab and the depth of insertion into the stick bore, some additional casing as shown at 20 is deshirred from the fore end of the stick and is inverted into the stick bore.

The inversion of tab 14 in this manner produces a cylinder 22 of casing material within the bore of the casing stick and about rod 18. In particular, this cylinder has a closed end 24 confined within the stick bore and an open end 26 towards the stick fore end 16.

One portion 28 of the cylinder wall contains only a single ply of casing material over its entire length. However, at a diametrically opposite side, the cylinder has a wall portion 30 that contains three plies of casing material and a wall portion 32 that contains only a single ply. Wall portion 30, which contains three plies of casing, is formed of the inturned tab 14, whereas the wall portion 32 is formed of the single ply of additional casing 20 which is deshirred from the stick when the rod 18 is inserted into the stick bore.

The relative lengths of wall portions 30 and 32 may vary. However, since a closed end 24 is important to the invention, it is preferred that the tab 14 be long enough to avoid the likelihood that the casing tab will slip from the rod and produce a cylinder of casing which is open at both ends. A cross-sectional view of the casing cylinder 22 is shown on an enlarged scale in FIG. 2A. This clearly shows the single ply of casing in wall portion 28 at one side of the cylinder and the three plies of casing in wall portion 30 at an opposite side.

A differential pressure is then created across the inturned casing cylinder 22 in order to draw and hold the wall portions 28, 30 and 32 against rod 18 (FIG. 3). Preferably, the differential pressure is created by drawing a vacuum through the hollow rod 18, which in turn evacuates the inturned casing cylinder 22 disposed about the rod. This forces the closed end 24 of the casing cylinder against the end 25 of the hollow rod. Evacuating the hollow rod also draws the entire casing cylinder 22 inward against the surface of the rod.

Figure 4:
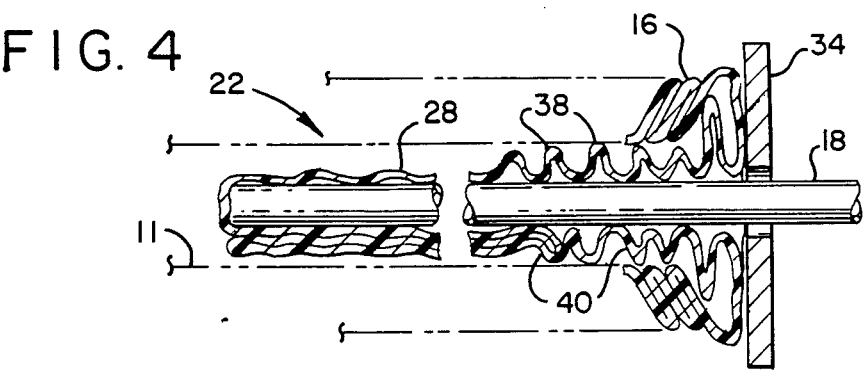

While maintaining the vacuum, the rod 18 is withdrawn from the stick bore (FIG. 4). The casing held against the rod by the vacuum is prevented from moving out of the stick bore by a stop 34 positioned across the stick fore end 16. As shown in FIG. 4, the casing cylinder 22 is wiped from the rod 18 into accordion-type pleats 38, 40 as the rod is withdrawn. Pleating begins adjacent stop 34, and progresses along the length of the rod.

It is important to note that maintaining the vacuum during rod withdrawal causes the casing to gather into pleats at the surface of rod 18. This allows the rod to maintain a diametrical separation of pleats 38, 40 so that, in longitudinal cross section, the pleats are arranged in two rows. Pleats 38 in one row are all formed from the single ply of casing along one side of rod 18. Pleats 40 (some of which contain three plies of casing and others only one ply) are in another row along a diametrically opposite side of rod 18. As best seen in FIG. 4, the pleats 38, 40 gather about the rod and extend outwardly so as to fill the space between the outer surface of rod 18 and the inner peripheral surface 11 of the casing stick. The accordion-type pleats formed in this fashion do not extend all the way across the bore of the shirred stick.

That is to say, the pleats 38 in one row do not extend to the inner peripherial surface 11 where the pleats 40 are located, and the pleats 40 in the other row do not extend to the inner peripherial surface 11 where the pleats 38 are located. Also, the concentration of casing material is greatest at the surface of rod 18 so the density of casing is greater along the rod than it is adjacent the inner peripheral surface 11 of the stick.

It is preferred that the vacuum drawn through rod 18 be high enough so that the entire casing cylinder 22 is gathered into pleats, because this will result in the lowest deplug force. However, it is likely that the rod, at some point, will slip and pull free of the casing, thereby leaving a portion 36 unpleated (FIG. 5).

Figure 5:
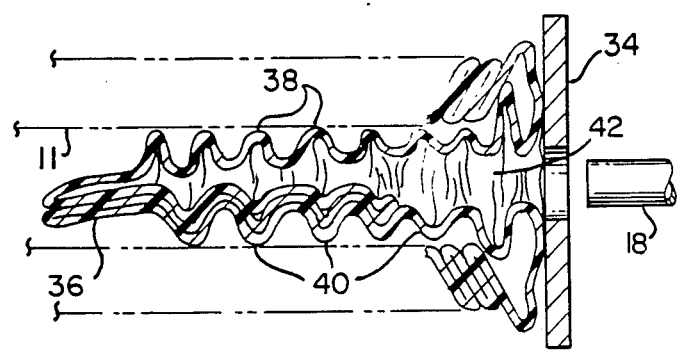

After the rod is removed, the casing cylinder 22 generally is in the form of a loose plug of casing material having an unpleated portion 36 and a pleated portion composed of loose pleats 38, 40 all disposed about a center core 42 left vacant by the removal of the rod (FIG. 5).

Figure 6:
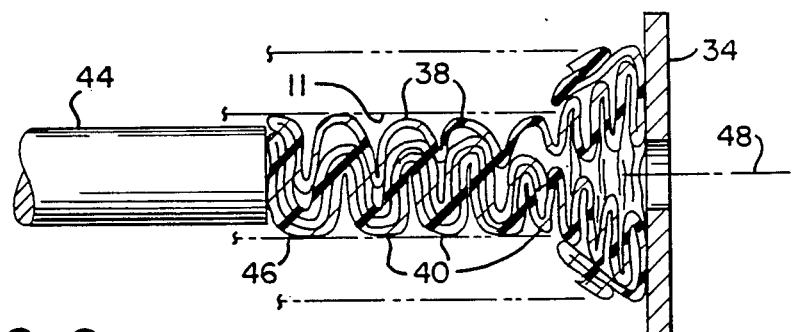

Next, a ram 44 is inserted into the stick bore, as shown in FIG. 6, to longitudinally compress the loose plug against stop 34. The ram 44 first engages the unpleated portion 36 and forces the plies of casing in this portion to collapse one against another into pleats 46 composed of four plies of casing. These pleats 46 are limited in number. They form against the inner peripheral surface 11 of the stick and extend fully across the longitudinal axis 48 of the shirred stick, so that the entire circumference of these pleats presses against the inner peripheral surface 11.

As the ram 44 continues to move towards stop 34, the loose, pre-formed, pleats 38, 40 begin to compress. However, the compaction of these pleats is different from the compaction of the initially unpleated portion 36. In this respect, FIG. 6 shows that the pleats 38 and the pleats 40 do not completely fold or merge one into another to form pleats of uniform density similar to pleats 46. Instead, the two rows of pleats 38, 40 tend to maintain an individuality and the pleats merge only at their proximal ends along a center core section as the pleats collapse radially inward towards axis 48 to fill the void left by the removal of rod 18. However, there is little or no merger of the pleats at their distal ends where these pleats 38, 40 press against the inner peripheral surface 11 of the stick bore.

Where pleats 40 contain three plies of casing, the density of the accordion pleat formation is asymmetrical about the longitudinal axis 48 of the stick. This is because compacted pleats 38, formed of only a single ply of casing material, are disposed in a row along the opposite side of the plug, and the single-ply pleats are less dense than the three-ply pleats.

Figure 7:
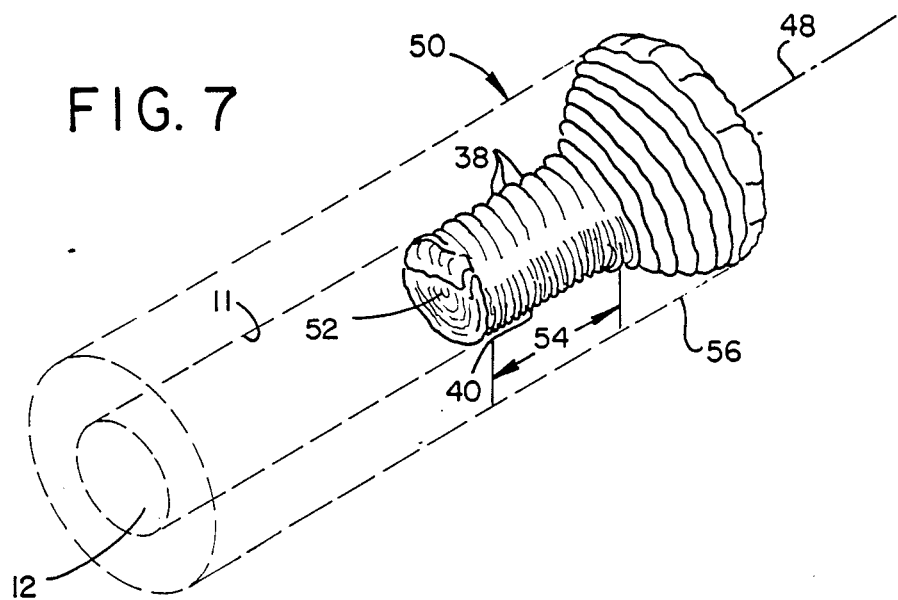
FIGS. 7 and 8 are two perspective views showing the plug as formed, with the shirred stick surrounding the plug being shown in dotted line.
Figure 8:
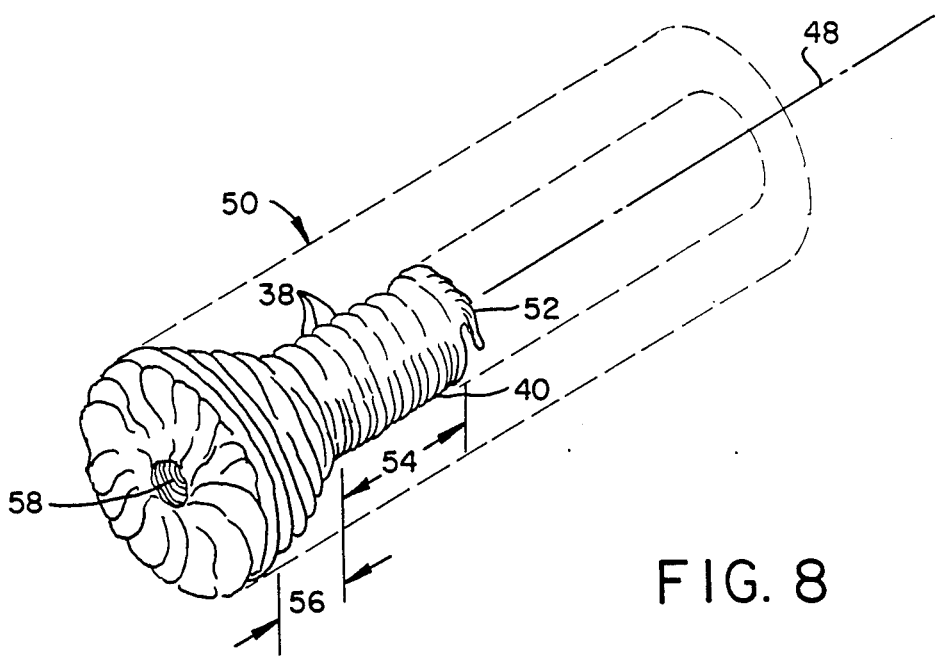

Further movement of ram 44 in this manner results in the compaction of the casing pleats to a generally cylindrical plug 50 shown in FIGS. 7 and 8. As shown in these figures, the preferred plug, as formed, has an innermost end portion 52 which has a density that is substantially uniform about the longitudinal axis 48. This innermost end portion 52 is composed of the compacted four-ply pleats 46 (FIG. 6) which extend across the bore of the shirred stick and press against the sides of the stick bore. To minimize the deplug force, it is preferred that the number of four-ply pleats be kept to a minimum (or eliminated) as set out hereinabove.

The plug also has an intermediate portion 54 composed of compacted accordion-type pleats. However, in a preferred embodiment this intermediate portion has a density which is asymmetrical about longitudinal axis 48. This is because a longitudinally extending section along one side of plug 50 is composed of casing pleats 38 only one ply thick, whereas a longitudinally extending section on a diametrically opposite side of plug 50 is composed of casing pleats 40, some of which are three plies thick. Where pleats 40 are three plies thick, the longitudinally extending section composed of pleats 38 is less dense than the diametrically opposite section composed of pleats 40.

Also, the compacted pleats 38, 40 in this intermediate portion 54 do not extend all the way across the stick bore as do pleats 46. In this respect, the inner or proximal ends of the pleats 38, 40 tend to merge along and about the core section (FIG. 6) so these pleats do not extend across the longitudinal axis 48 and they do not press against the opposite sides of inner peripheral surface 11. This concentrates casing material from both the single ply and three ply pleats generally along and about a center core portion so the density of plug 50 in this center core portion tends to be greater than the density about the outer periphery of the plug.

A second and outermost end portion of the plug is shown at 56. This outermost end portion 56 contains the face of the plug which faces outward from the stick bore. The pleats of end portion 56 are composed of only a single ply of casing and they represent the additional casing 20 of FIG. 2 which was deshirred from the stick fore end 16 upon inturning tab 14. The density of this end portion 56, as best seen in FIG. 6, is relatively uniform about longitudinal axis 48 because all of its pleats are composed of casing only one ply thick. If tab 14 is relatively short, then end portion 56 will be longer than shown since more additional casing 20 is deshirred from the stick fore end 16. Should little or no additional casing 20 be deshirred upon inturning tab 14, then end portion 56 would have more of an asymmetrical density about the longitudinal axis, since it will contain some pleats comprising three casing plies and it will be similar in structure to the intermediate portion 54.

Another feature of end portion 56 is the depression or opening 58 which opens outward from the end face of the plug. This opening 58 is the remnant of the void 42 left upon withdrawal of rod 18. While this opening generally is present in end closures made according to the present invention, its presence, and its depth when present, is determined in part by the compaction force exerted by ram 44.

As previously noted, it has been found that an end closure made in accordance with the present invention has a lower deplug force than comparable end closures made by the commonly employed prior art method of inturning the casing and then compacting the inturned casing as shown in U.S. Pat. No. 3,383,222. In addition, the deplug force of the end closure of the present invention can be increased from some minimum value to meet the needs of the customer.

Prior to the present invention, the deplug force of a given end closure was a compromise between the length of the inturned casing and the force applied to compact the inturned casing. Changing one or the other to increase or decrease the deplug force compromised either the ability of the end closure to contain the stuffing pressure at the onset of stuffing or its ability to be stripped or milked at the end of the stuffing operation. Now, however, it has been found that the deplug force can be varied to suit a customer's needs without changing either the length of the inturned casing or the compaction force. Both the length of inturned casing and the compaction force are first selected to provide the end closure with the optimum pressure containment and stripping characteristics. Once these are established, the deplugging force can be altered to match the needs of the customer by changing only the differential pressure across the inturned casing cylinder.

Casing sticks having integral end closures of the present invention were made in accordance with the Examples as set out hereinbelow. These sticks were used in stuffing tests and functioned satisfactorily.

Tests were conducted, as set out in the following Examples, to demonstrate that end closures according to the present invention have a lower deplug force than comparable inturned and longitudinally compacted end closures of the prior art and that the deplugging force can be controlled by altering the magnitude of the differential pressure across the inturned casing cylinder during pleat formation.

EXAMPLE I

As a control, forty (40) casing sticks were shirred of a conventional size 24 cellulosic casing having an inflated diameter of about 0.81 inch. End closures containing about 12 inches of casing were formed by a conventional method as disclosed in Alsys et al, U.S. Pat. No. 3,383,222. In this respect, a tab of casing was pulled from the stick and laterally across the bore. A hollow inverting rod inverted this tab of casing into the stick bore to produce a casing cylinder within the stick bore which was longer than the tab. A tamper then compacted the casing cylinder within the stick bore to a preset length to form the end closure.

The identical procedure was used to form end closures in a second set of forty sticks except that the hollow rod was connected to a vacuum of twenty (20) inches of mercury. As the rod was pulled from the stick bore, the casing cylinder was formed into pleats about the rod in accordance with the present invention. After the rod pulled free of the casing, the resulting prepleated casing cylinder was compacted to the same preset length to form the end closure.

Both the control set of sticks and the second set of sticks were divided into four groups of ten sticks each for measurement of the deplug force immediately after shirring, and at various times thereafter. The test results, as set out in Table I, demonstrate that the average deplug force for end closures made with a vacuum assist in accordance with the preferred method of the present invention, was about half the deplug force of the end closures made in the conventional manner without a vacuum assist.

TABLE I

EFFECT OF VACUUM ASSIST ON DEPLUG FORCE

| Time | Average Deplug Force in lbs. With (Without) Vacuum Assist | Standard Deviation With (Without) Vacuum Assist |
|---|---|---|
| after shirring | 3.2 (7.4) | 0.725 (1.035) |
| after one day | 3.3 (6.9) | 0.780 (1.029) |
| after seven days | 3.4 (7.4) | 0.504 (0.671) |
| after twenty-one days | 3.7 (8.1) | 0.727 (1.024) |

EXAMPLE II

To demonstrate that the deplug force is controllable, end closures were made at various vacuum levels using the same procedure as used in Example I. Each time after the inverting rod pulled free of the casing, the resulting prepleated casing cylinder was compacted to a preset length within the bore of the casing stick. The deplug force was measured for all sticks after one day. The average deplug force of ten sticks is given in Table II below.

TABLE II

EFFECT OF THE LEVEL OF VACUUM ASSIST ON DEPLUG FORCE

| Vacuum in Inches of Hg | Average Deplug Force (lbs.) | Standard Deviation |
|---|---|---|
| 8 | 7.00 | 1.875 |
| 13 | 6.10 | 1.370 |
| 20 | 4.9 | 1.044 |

These results show that as the vacuum or differential pressure increases, the deplug force decreases. Thus, once a minimum deplug force is established, the needs of a customer for a higher deplug force can be accommodated by lowering the vacuum conditions under which the inturned casing cylinder is pleated.

It is thought that as the vacuum decreases, the inverting rod slips or pulls free of the casing cylinder so that less of the cylinder is gathered into pleats. This leaves a longer unpleated portion 36 (see FIG. 5) for subsequent compression into pleats 46 containing four plies of casing which press against the inner peripheral surface 11 of the stick bore (see FIG. 6).

Thus, it should be appreciated that the vacuum assist of the present invention provides an end closure having a deplug force which is lower than the deplug force of an axially compressed end closure made by comparable prior art methods, but without vacuum assist. Moreover, this deplug force is adjustable without changing either the length of casing in the end closure or the compaction force used to compact the closure.

Having thus described this invention in detail, what is claimed as new is:

1. A tubular shirred stick casing article having an inner peripheral surface which defines an axial bore through the article, and an integral end closure disposed within the bore at a fore end thereof, the end closure being composed of casing drawn from the fore end of the shirred stick and formed into a plug within the bore, said plug comprising:
   (a) a generally cylindrical body composed throughout its length of accordion-type pleats including a first end portion facing into said bore, an intermediate portion, and a second end portion facing out from said bore;
   (b) said first end portion containing pleats which extend across said bore and which press against said inner peripheral surface to form an imperforate and continuous wall transverse to the longitudinal axis of said bore; and
   (c) said intermediate portion containing pleats which, in longitudinal cross section, are arranged in two longitudinally extending rows, one of said longitudinally extending rows being composed of pleats of a single ply of casing and the other of said rows being composed of pleats of three plies of casing and the pleats in said rows having proximal ends pressed one against another along a center core about the longitudinal axis of said bore and distal ends pressed against said inner peripheral surface.

2. A casing article as in claim 1 wherein said first end portion is of pleats containing four plies of casing.

3. A casing article as in claim 1 wherein said second end portion is composed of pleats containing a single ply of casing.

4. A casing article as in claim 1 wherein said first end portion is composed of pleats formed of four plies of longitudinally pleated and compacted casing and is substantially uniform in density about the longitudinal axis of said plug.

5. A casing article as in claim 1 wherein said second end portion facing outward with respect to said stick bore is substantially uniform in density about the longitudinal axis of said plug and is composed of accordion-type pleats formed of a single ply of longitudinally pleated and compacted casing.

6. A casing article as in claim 1 or 5 wherein said second end portion has an opening facing outward from an end face thereof.

* * * * *

UNITED STATES PATENT AND TRADEMARK OFFICE
CERTIFICATE OF CORRECTION

PATENT NO. : 4,693,280
DATED : September 15, 1987
INVENTOR(S) : Robert A. Beardsley It is certified that error appears in the above—identified patent and that said Letters Patent is hereby corrected as shown below:

In col. 2, line 13, change "3,892" to -- 3,892,869 --.

In col. 5, line 7, change "sectibn" to -- section --.

Signed and Sealed this

Third Day of May, 1988

Attest:

DONALD J. QUIGG

*Attesting Officer*

Commissioner of Patents and Trademarks